Dec. 19, 1961  H. W. BRUNTJEN  3,013,775
BULK BEVERAGE AERATING AND DISPENSING MACHINE
Filed May 8, 1958  3 Sheets-Sheet 1

INVENTOR.
HANS W. BRUNTJEN
BY
Merchant & Merchant
ATTORNEYS

INVENTOR.
HANS W. BRUNTJEN

Dec. 19, 1961 H. W. BRUNTJEN 3,013,775
BULK BEVERAGE AERATING AND DISPENSING MACHINE
Filed May 8, 1958 3 Sheets-Sheet 3
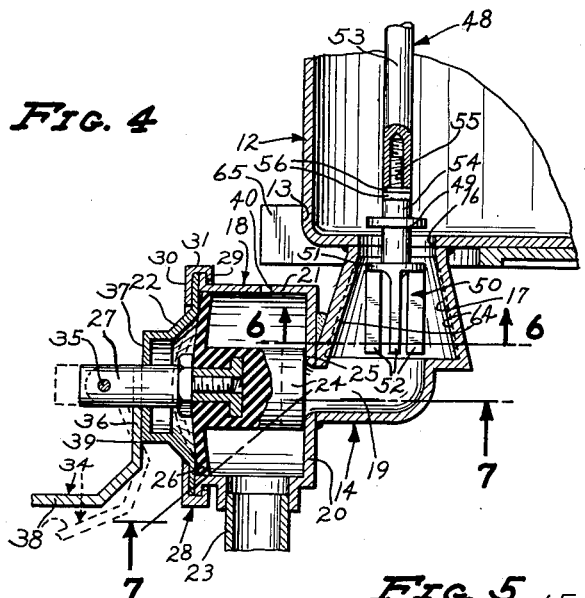
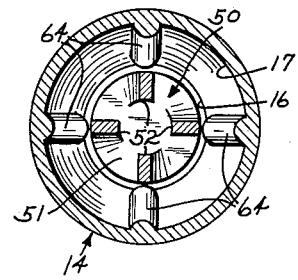
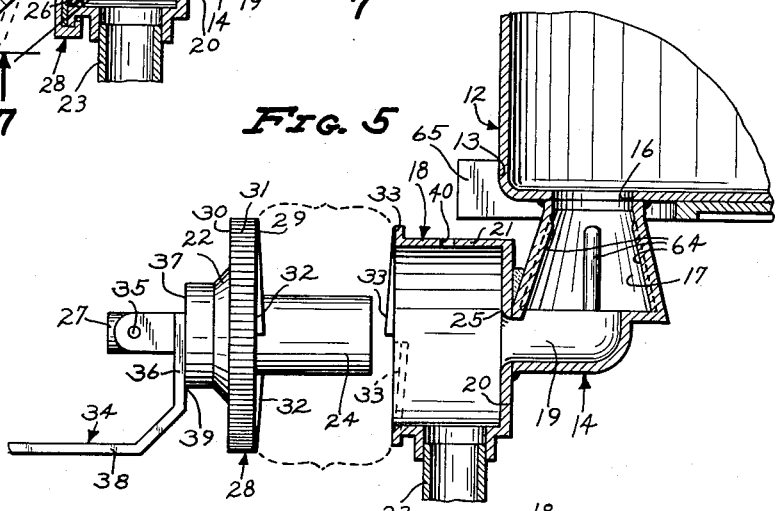
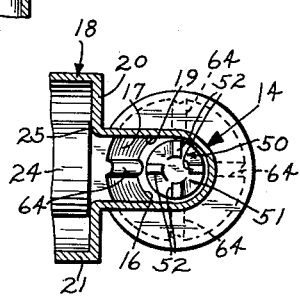
INVENTOR.
HANS W. BRUNTJEN
BY
Merchant & Merchant
ATTORNEYS 

3,013,775
BULK BEVERAGE AERATING AND DISPENSING MACHINE

Hans W. Bruntjen, Minneapolis, Minn., assignor, by mesne assignments, to Carnation Company, Los Angeles, Calif., a corporation of Delaware Filed May 8, 1958, Ser. No. 734,016
10 Claims. (Cl. 259—44)

Generally speaking, my present invention relates to improvements in machines for storing, dispensing and aerating bulk beverages of kinds which are improved by aeration resulting from violent agitation in the presence of air immediately prior to serving, and which beverage kinds comprise varieties which are generally served in a warmed or heated condition and varieties which are generally served in a cooled or chilled condition. More particularly, the instant invention relates to improvements in machines of this general character wherein bulk beverage is stored in a suitable reservoir from which it is dispensed in accordance with customer demand and in which the beverage is aerated to a smooth creamy consistency during each dispensing period by subjection thereof to violent agitation in the presence of air after leaving the reservoir and during its passage from the reservoir to a receiving receptacle such as a drinking glass or cup in which the beverage is to be served to the customer. The machine of the instant invention belongs to the same general classification as does the machine of the prior Bruntjen Patent #2,775,877 of January 1, 1957, but possesses a number of very important advantages over the machine of said prior Bruntjen patent and other prior are machines, including the following:

A. Greater simplicity of structure resulting in reduced manufacturing cost and a great reduction of maintenance costs;

B. Greater accessibility of all working parts reducing service time and cost to a minimum; and C. Greater accessibility of all working parts and beverage contacting areas and passages for periodic cleaning, which factor not only reduces normal machine maintenance time and resultant costs but also provides vastly increased assurance against beverage contamination especially when the machine is used in connection with milk product containing beverages such as hot chocolate, cocoa or the like.

Actually the machines of the instant invention are adapted for use in connection with any type of beverage, whether it be of the type that is served hot or cold, that is improved by aeration. Among the chilled beverages that are improved by the aerating effect of the machines of the invention are orange beverages, grape beverages and chocolate-flavored beverages. Among the numerous heated beverages that are improved by the aerating action of the machines of the instant invention are hot chocolate and hot cocoa.

The above and other highly important objects and advantages of the invention will be made apparent or further emphasized in the following specification, claims and appended drawings.

In the accompanying drawings like characters indicate like parts throughout the several views.

Referring to the drawings:

FIG. 4 is a greatly enlarged fragmentary detail sectional view taken approximately on the line 4—4 of FIG. 2;

FIG. 5 is a detail sectional view corresponding generally to FIG. 4 but having the agitator and agitator shaft omitted therefrom and showing the valve in a disassembled condition;

FIG. 6 is a detail view in horizontal section taken approximately on the line 6—6 of FIG. 4 and looking upwardly with respect to FIG. 4; and FIG. 7 is a detail horizontal sectional view taken approximately on the line 7—7 of FIG. 4 and looking upwardly with respect to FIG. 4.

Figure 1:
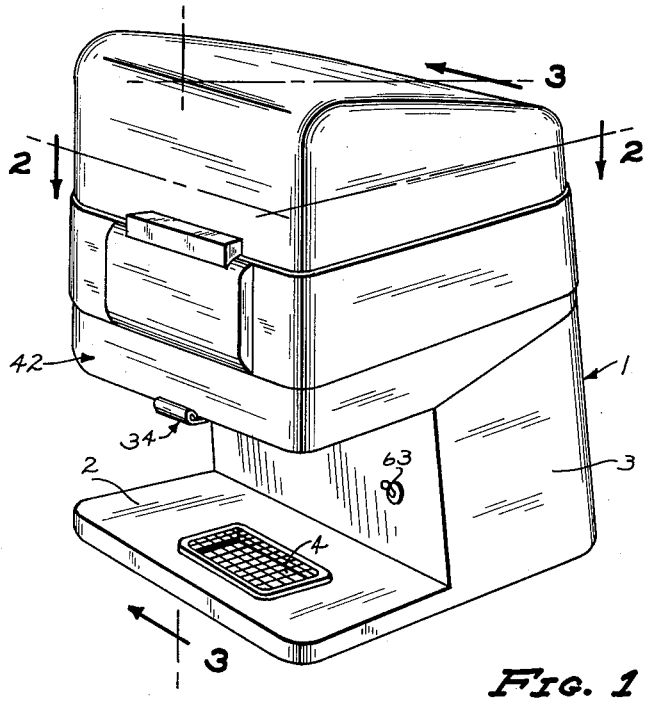
FIG. 1 is a front and side perspective view of a machine incorporating a preferred embodiment of the invention.

In the drawings hereof the base structure is indicated as an entirety by 1 and comprises a table portion 2 and an upstanding hollow pedestal portion 3. The table portion 2 of the base structure 1 is preferably provided with a recess 4 for receiving and positioning the bottom portion of a beverage receptacle, such as a conventional drinking cup or glass, in which the beverage will be served to the customer. Because the particular machine illustrated is, by virtue of its being equipped with a beverage heating means, particularly adapted for the handling of beverages such as hot chocolate, the above mentioned receptacle is shown as being a conventional drinking cup 5.

Figure 2:
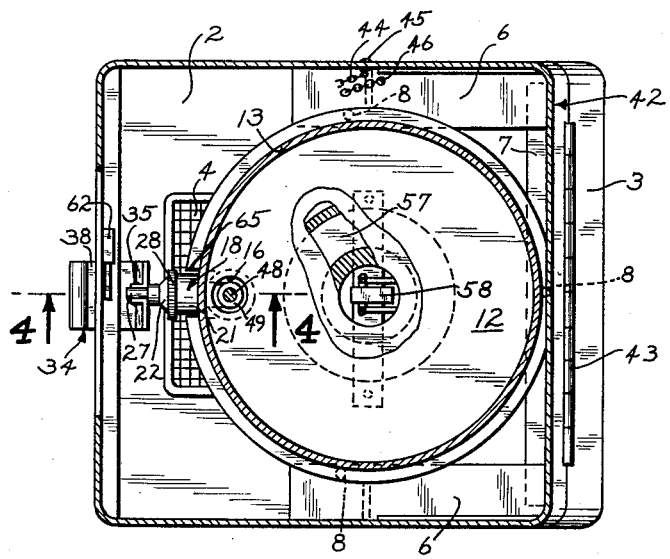
FIG. 2 is an enlarged horizontal sectional view taken approximately on the lines 2—2 of FIG. 1.
Figure 3:
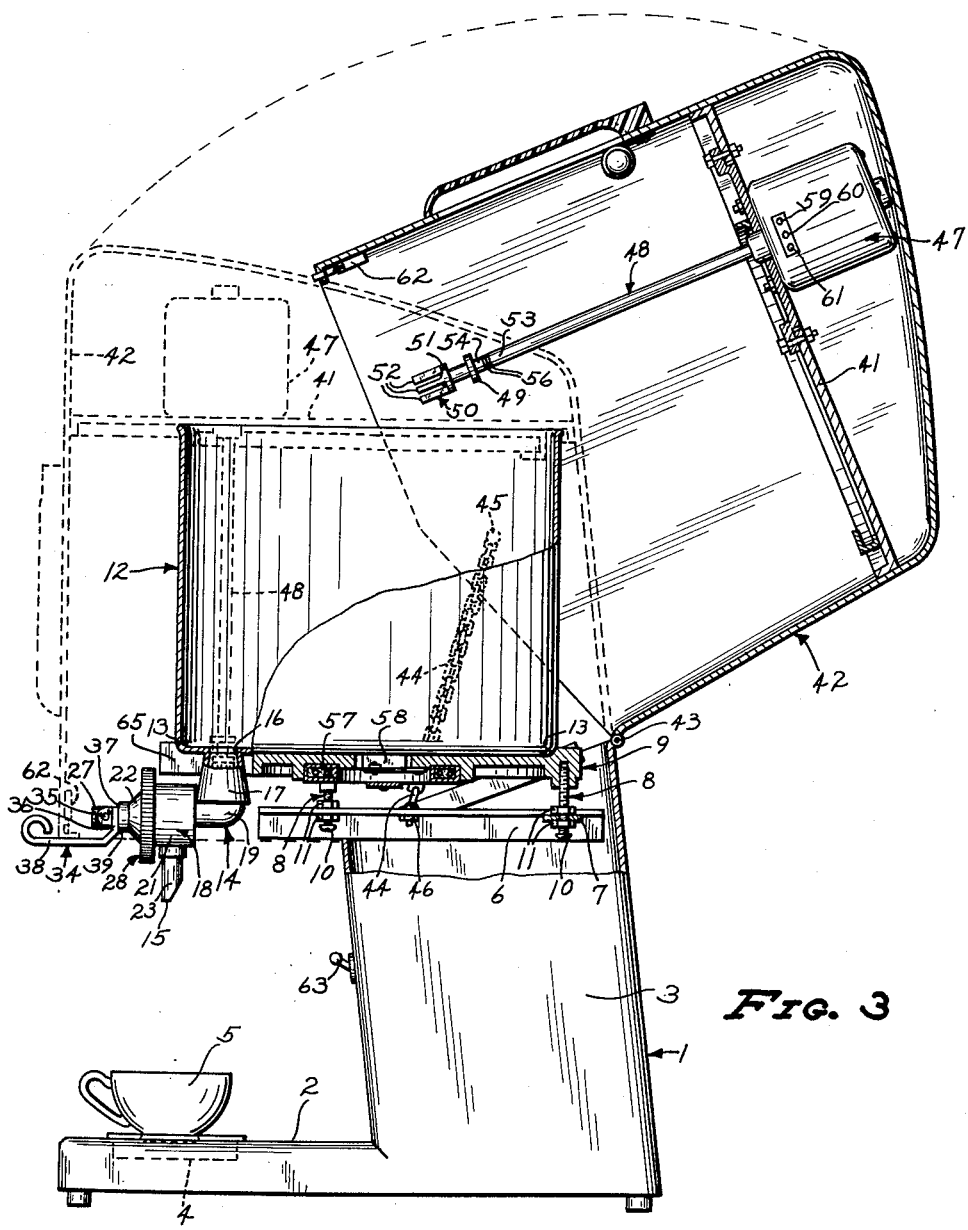
FIG. 3 is an enlarged view of the machine of FIG. 1 shown in side elevation, looking from left to right with respect to FIG. 1, with some parts broken away and sectioned approximately on the line 3—3 of FIG. 1, and differing from FIG. 1 to the extent that the hood of the machine is shown in its open or inoperative position in FIG. 3 whereas it is shown in its normally closed position in FIG. 1.

Suitably but rigidly mounted in the otherwise open top portion of the base pedestal 3 is a pair of laterally spaced mounting plates 6 connected at their rear portions by a cross member 7 shown best in FIGS. 2 and 3. Overlying and mounted on the mounting plates 6 and cross member 7, through the medium of leveling legs 8, is a reservoir supporting shelf structure 9. Preferably and as shown these supporting legs 8 each comprise a threaded screw 10 and nuts 11.

Seated upon the shelf structure 9 is a large open-topped container 12 which serves as a reservoir for bulk beverage such, for example, as hot chocolate. In the present commercial embodiments of the invention this reservoir 12 is of stainless steel. Preferably, and as shown, the shelf structure 9 is provided in its upper surface with a large recess 13 shaped to rather snugly receive and center the bottom portion of the reservoir 12. In this structure the reservoir 12 is merely gravity seated on the recess portion of the shelf structure 9 and is forwardly displaceable therefrom after having elevated the reservoir 12 out of the shelf recess 13.

Carried by and depending from the front bottom portion of the reservoir 12 is a gravity flow discharge conduit, indicated as an entirety by 14, having a normally open discharge end 15 spaced from the reservoir. Preferably and as shown this gravity flow discharge conduit 14 comprises a throat portion 16 immediately adjacent the inside of the reservoir 12, a diametrically enlarged intermediate portion adjacent the throat 16 defining an aerating chamber 17 and another diametrically enlarged portion 18 intermediate the aerating chamber 17 and the discharge end 15 which defines a valve casing. The common axes of the aerating chamber 17 and throat 16 is generally vertical and, therefore, generally parallel to the vertical axis of the reservoir 12. It should be noted that the portion of the conduit 14 defining the aerating chamber 17 flares radially outwardly and downwardly in a progressively expanding manner from the throat portion 16 to provide a progressively expanding downwardly flaring aerating chamber. In the preferred structure illustrated, the valve casing 18 is disposed on a generally horizontal axis and is in axial gravity flow communication with the open bottom of the aerating chamber 17 through an intermediate conduit portion 19 that opens through the fixed back or inner end wall 20 of the valve casing 18. In this preferred structure the valve casing forming portion 18 of the discharge conduit 14 comprises the said fixed rear end wall 20, a generally cylindrical marginal side wall portion 21 and a displaceable front end wall 22. In this structure the valve casing 18 discharges through a generally vertically disposed downwardly directed final conduit section 23 defining the discharge end 15, which latter is located above and in coaxial alignment with the beverage receptacle receiving recess 4 of table portion 2 of base 1 and, hence, directly above a serving receptacle, such as a drinking glass or cup 5, placed in the recess 4.

For controlling the flow of beverage through the discharge conduit 14 there is provided within the valve casing portion 18 a resilient valve plunger 24 that cooperates with an annular valve seat area 25 defined by the end wall 20 and coaxial with the axial opening through the end wall 20 of the casing. In this preferred structure the valve plunger 24 is preferably formed of rubber or synthetic rubber, such as neoprene, having suitable resilience and integrally formed with a resilient flange 26 extending radially to the marginal casing wall 21 and bearing against the displaceable valve casing end wall 22, all as best shown in FIG. 4. By further reference to FIG. 4 it will be noted that the resilient valve plunger 24 is fixedly mounted on the end of a rigid metallic valve stem 27 that works axially in and projects outwardly through the displaceable valve casing end wall 22. Also, by further reference to FIG. 4 and by reference to FIG. 5, it will be seen that the displaceable valve casing end wall 22 is snugly seated against the annular open end of the marginal wall portion 21 and is detachably locked in its operative position shown in FIG. 4 by a lock ring 28 of conventional nature. The lock ring 28 comprises axially spaced inner and outer end flanges 29 and 30 respectively and a cylindrical marginal wall 31 defining a channel in which the casing end wall 22 is locked. The flange 30 is completely annular and the flange 29 comprises a plurality of circumferentially spaced segmental helical sections 32 which cooperate with mating outturned helical flange sections 33 on the marginal valve casing wall portion 21; the locking arrangement here being closely analogous to conventional bayonet locking arrangements. With this structure to unlock the end wall 22 for removal from the marginal wall portion 21 the lock ring 28 is merely rotated a partial turn in one direction to release the helical flange sections 32 from the helical flange sections 33, and of course exactly the reverse procedure is followed to relock the detachable end wall 22 on the fixed marginal wall 21. In the valve structure illustrated the valve plunger 24 is normally maintained in its valve closed fluid sealing position of FIG. 4 by the resilient action of its integrally formed resilient flange 26 which is maintained in an inwardly flexed condition by the displaceable end wall 22. For operational convenience the valve stem 27 is equipped with an operating lever 34 pivoted to the free outer end portion of the stem 27 at 35 and comprising a downwardly extending portion 36 that normally lies flat against the flat end 37 of the displaceable valve casing end wall 22, as shown best in FIGS. 4 and 5, and further comprises an outwardly turned handle portion 38. To open the valve the handle portion 38 of lever 34 is depressed from the position shown by full lines in FIGS. 4 and 5 to the dotted line position of FIG. 4, thereby causing the depending portion 36 of lever 34 to fulcrum or rock on the sharp shoulder portion 39 of the displaceable end wall 22 and retract the valve plunger 24 away from the valve seat 25 to the valve open position shown by dotted lines in FIG. 4 against the yielding action of the resilient flange 26. When the lever 34 is released the valve plunger 24 is automatically returned to its closed position by the yielding action of the flange 26. Preferably the valve casing 18 is vented to atmosphere at 40.

The reservoir 12 is normally closed by a displaceable cover plate 41 best shown in FIG. 3. In the preferred embodiment of the invention illustrated this reservoir cover plate 41 is carried by and forms part of a displaceable hood structure 42 that is normally disposed over and conceals the reservoir 12. As best shown in FIG. 3 this hood structure 42 is pivotally or hingedly connected to the upper end portion of the pedestal portion 3 of the base 1 at 43 for swinging movements between a normal closed position shown by dotted lines in FIG. 3 and an open position shown by full lines in FIG. 3. Preferably the extreme open position of the hood structure 42 is established by suitable stop means such as a link chain 44, shown best in FIGS. 2 and 3, which is anchored at one end to a side of the hood structure 42 at 45 and at its other end to one of the mounting plates 6 at 46.

Mounted on the reservoir cover plate 41 of the hood structure 42 is a conventional electrically driven agitator motor 37 which directly drives a depending agitator shaft 48 that extends downwardly through the reservoir 12 and the fluid or beverage contained therein and is, when the hood structure is closed, coaxial with the aerating chamber 17 and throat portion 16 of the discharge conduit 14. The lower end portion of the agitator shaft 48 extends coaxially through the throat portion 16 and into the aerating chamber 17, as shown best in FIG. 4, and is provided adjacent but somewhat above the extreme bottom of the reservoir 12 with a radially enlarged disc-like agitator flange 49 and is provided within the aerating chamber forming portion 17 with an agitator 50. The agitator 50 comprises a diametrically enlarged disc-like head portion 51 located in adjacent cooperative relationship to the throat portion 16 and carrying a plurality of circumferentially spaced agitating blades 52 extending to the vicinity of the relatively large diameter bottom portion of the aerating chamber 17. The lower ends of the agitating blades are free and unconnected and said blades are disposed generally radially of the shaft axis. The radially inner and outer edges of the blades 52 extend generally parallel to the axes of agitator shaft 48 and aerating chamber 17 and the inner edges thereof are spaced from one another and the shaft axis. The agitator head portion 51 has a diameter somewhat less than the minimum diameter of the aerating chamber 17 and throat portion 16 to allow upward removal of the agitator from the aerating chamber and throat portion and to allow beverage to flow there-past through the aerating chamber when the valve 24 is open. However, the agitator head portion 51 is imperforate or substantially so and is of sufficient diameter to provide, in conjunction with the radially adjacent wall portion of conduit 14, an area of maximum restriction in the conduit 14 when the valve 24 is open. This area of maximum restriction in the discharge conduit 14 ahead of the aerating chamber or active portion thereof provides assurance against the building up of a head of liquid in or filling of the aerating chamber with liquid when the valve 24 is open. In other words, because the said "area of maximum restriction" in the discharge conduit 14 is ahead of the aerating chamber 17, liquid will flow freely and unrestrictedly through said conduit when the valve 24 is open. Obviously, under these free flowing conditions neither the aerating chamber 17 or portions of the conduit 14 therebeyond will be filled with liquid and such conduit spaces as are not occupied by free flowing liquid will be occupied by air, and such air as is whipped into the flowing liquid and discharged therewith will be replaced from atmosphere through the open discharge end 15 of the conduit 14 and/or through the vent 40. Hence, it will be obvious that, when the valve 24 is open, the agitator 50 will serve only to violently agitate the beverage in the presence of an ample supply of air during the brief interval while the beverage is flowing freely there-past to the discharge end 15 of the conduit 14.

It should be understood that the main purpose of beverage aeration, such as is achieved in the present machine by violent agitation in the presence of air immediately prior to serving, is to impart to the beverage a smooth creamy consistency. Also, it should be understood that different beverage compositions are brought to an optimum condition by somewhat different degrees of aeration. The present machine may readily be adjusted to achieve such varying degrees of aeration by the simple expedient of shifting the flow restricting head 51 of the agitator 50 axially of the outwardly flaring side wall portions of the aerating chamber 17 and throat portion 16 to thereby vary the degree of flow restriction and resultant rate of flow past the agitator 50. In this connection it will be noted that the agitator shaft 48 is a composite structure comprising a main upper section 53 and a lower agitator carrying section 54 connected to the shaft section 53 by an integrally formed threaded stud portion 55. By reference to FIG. 4 it will be seen that the agitator shaft 48 further comprises a plurality of spacing washers 56, the number of which can be varied to accomplish the above mentioned variable restriction positioning of the agitator head 51 with respect to the upper end portion of the aerating chamber 17 and throat portion 16. Of course the same flow rate adjustment can be achieved by substituting for either of the shaft sections 53 or 54 a corresponding shaft section of slightly different length or by repositioning the motor 47.

Since the machine illustrated was designed for use in connection with a beverage such as hot chocolate, which is served in a heated condition, there is provided a suitable electric heating element 57 shown in FIG. 3. In the preferred structure this heating element is of conventional annular construction and is applied to the bottom of the reservoir supporting shelf structure 9. Preferably the energizing circuit, not shown, for this heating element will include a suitable thermostatic control switch associated with the bottom of the reservoir 12 and roughly indicated as an entirety by 58 on FIG. 3.

In the commercial machine illustrated the agitator motor 47 is of a conventional two-speed variety having low speed and high speed circuit input means; the high speed circuit means comprising a terminal 59 and a common circuit terminal 60 and the low speed circuit means comprising a terminal 61 and said common terminal 60. The actual circuits for the two-speed motor 47 and heating element 59 are not shown herein since these and certain other features of the machine illustrated are shown in my companion application Serial No. 733,883, filed May 8, 1958, to which cross reference is hereby made. Briefly described, however, it may be said that the heating element 57 is operated to maintain a constant desired temperature of the beverage in the reservoir 12 and the motor 47 is operated steadily between dispensing periods at low speed and is automatically cut into high speed operation through the medium of a hood-carried switch 62, shown in FIG. 3, under control of the valve operating lever 34, during each dispensing period.

Assuming now that the reservoir 12 is filled or partially filled with a suitable beverage, such as hot chocolate, the operation will be generally as follows. Upon such filling of the reservoir 12 the heating element 57 and the low speed circuit of the motor 47 will be connected to a common power source by means of a manually operated control switch 63 shown in FIG. 3. The circuit of the heating element 57 will now remain under control of the thermostatic control switch 58 to maintain a desired uniform serving temperature of the reservoir contained beverage and the motor 47, agitator shaft 48, agitator flange 49 and agitator 50 will operate continuously between dispensing periods at a selected low speed which, in the instant machine, is two thousand revolutions per minute (2000 r.p.m.). Under this low speed operation of the motor 47 that portion of the agitator shaft 48 submerged in the reservoir contained beverage will subject to the reservoir contained beverage a mild agitation sufficient to prevent separation of the beverage ingredients and equalize the temperature throughout the body of liquid but insufficient to cause undue frothing or foaming of the reservoir contained beverage and insufficient to impart such centrifugal action to the beverage as to cause spillage over the top of the reservoir 12 even when the normal beverage level is quite close to the top. Also under this low speed operation of the agitator motor 47 and shaft 48 the agitator 50 will be in continuous operation, but its action will be limited to causing a continuous rotation of the beverage entrapped in the aerating chamber 17 and adjacent conduit portions all ahead of the valve casing 18, since the valve 24 is closed during these periods and there is no flow of beverage through the conduit 14. In fact, this continuous low speed rotary circulation of fluid entrapped in the aerating chamber 17 between dispensing periods will have no appreciable effect upon the main body of beverage contained in the reservoir 12 and will simply serve to prevent sedimentation or separation of the components of the beverage contained in that portion of the conduit 14; it being understood that the beverage entrapped in the aerating chamber 17 when the valve 24 is closed is deprived of a supply of air such as is necessary for aeration.

Now when the valve 24 is opened through manipulation of the actuating lever 34 the high speed input circuit means of the motor 47 will be coupled to a suitable supply circuit by means of the control switch 62 and the agitator shaft 48 and its agitator 50 will go into high speed operation, which may be and in the present machine is eighteen thousand revolutions per minute (18,000 r.p.m.). Desirably the valve lever operated control switch 62 will cut the agitator motor 47 into high speed operation just before or during initial opening movements of the valve control lever 34 so that the fluid previously entrapped in the aerating chamber 14 and all fluid flowing from the reservoir 12 through the aerating chamber upon opening of the valve 24 will be subject to the required degree of aeration by violent high speed agitation in the presence of an ample supply of air entering the aerating chamber 17 from the interior of the valve casing 18. It should be understood that during dispensing periods air can enter the interior of the valve casing 18 through the vent 40 and also can enter the valve casing through the final conduit section 23 against and through the outwardly or downwardly flowing stream of liquid.

The aerating function of the instant machine is gone into more fully in my before identified companion application Serial No. 733,883, filed May 8, 1958, but briefly described is generally as follows. When the valve 24 is open and the agitator 50 is operating at high speed, fluid flows through the aerating chamber at a rate determined by the diameter of the agitator head 51 with respect to the diameter of the radially adjacent conduit wall; the said agitator head 51 serving to create an adjacent area of maximum restriction in the conduit 14 to fluid flowing therethrough so that all fluid entering the aerating chamber 17 will flow freely therethrough with no restriction thereafter sufficient to cause the building up of a head of liquid in the aerating chamber during a dispensing period when the valve 24 is open. Fluid entering the aerating chamber past the agitator head 51 will be subject to the violent agitating effect of the rapidly rotating agitator blades 52; the agitator blades 52 imparting rapid rotation to the engaged fluid and throwing the same outwardly against the adjacent downwardly diverging wall portions of the aerating chamber 17 under the action of centrifugal force. The fluid upon striking the downwardly diverging walls of the aerating chamber tends to move rapidly downward therealong by angular deflection due to the divergence of the chamber walls and the action of gravity. Of course some of the fluid thrown violently against the diverging walls of the aerating chamber 17 is deflected back to the rotating agitator blades 52 and subjected to further atomizing action in the presence of air. In fact it is believed that much of the fluid passing through the aerating chamber may pass back and forth several times between the blades 52 and the adjacent wall portions of the aerating chamber during its flow through the aerating chamber. In the preferred embodiment this sort of bounce action is encouraged and the aerating effect improved by forming the interior of the diverging walls of the aerating chamber 17 with circumferentially spaced longitudinally extending radially inwardly projecting ribs 64. It is important that the agitator blades 52 extend substantially the full axial length of the downwardly diverging aerating chamber and that their inner edges are spaced apart. With this construction aerating agitation is carried out for an extended interval of time while the beverage is flowing through the aerating chamber. Furthermore, the main bulk of the fluid passing through the aerating chamber is maintained radially outwardly of the inner longitudinal edges of the agitator blades 52 and a void area is maintained adjacent the axes of the agitator 50 and aerating chamber 17 whereinto air can freely flow into the axial portion of the agitator from the free lower end of the agitator and wherefrom it will be continuously thrown outwardly under the centrifugal action produced by the blades 52 into the violently agitated and finally divided or atomized liquid passing through that portion of the aerating chamber radially outwardly of said agitator blades 52. In this manner there is provided a continuous circulation of air through that portion of the aerating chamber wherein the liquid beverage is being temporarily converted to a finely divided spray-like condition. Hence all the beverage flowing from the aerating chamber to the serving receptacle 5 or its equivalent is aerated to an extremely smooth creamy consistency.

An important feature of the instant invention comprises the mounting of the agitator shaft 48 on the pivotally or hingedly mounted reservoir covering structure in such a manner that, upon pivotal swinging movements of the cover structure from a normal closed position to an open position, the agitator shaft will move from its operative position, wherein it is largely disposed in the reservoir 12 and the agitator portion 50 thereof is disposed in the aerating chamber, to an inoperative position completely removed from the aerating chamber 17 and at least sufficiently removed from the reservoir 12 to allow displacement of the latter. In the machine illustrated this important objective is achieved by locating the hinge or pivotal connection 43 between the motor mounting reservoir cover plate 41 and the base structure 1 in widely spaced relation to the axis of the aerating chamber 17 and in a horizontal plane closely adjacent the bottom of the reservoir 12 and sufficiently close to the horizontal plane of the restricted throat area 16 of the conduit 14 that under initial opening movements of the cover and final closing movements of the cover the agitator will respectively move out of and into the aerating chamber on an arcuate path that is generally tangential to the axis of the aerating chamber 17 and of such radius that the agitator will not come into contact or at least binding contact with any portion of the conduit 14 during insertion into or removal from the aerating chamber.

When the hood structure 42 together with the motor mounting cover plate 41, motor 47 and the motor driven agitator shaft 48 are moved as a unit to their inoperative positions shown by full lines in FIG. 3 the entire agitator shaft structure is radially accessible for cleaning as is also the complete interior of the hood structure including the underside of the cover plate 41. Also, when the hood and cover structure 41—42 is in its full line open, inoperative position of FIG. 3 the entire interior and exterior surfaces of the reservoir 12 are exposed and accessible for cleaning without removing the reservoir from its operating condition and the complete reservoir 12 and the valve and conduit mechanism carried thereby is readily displaceable as a unit for thorough cleaning and/or service.

A further important feature of the instant invention, and one which is of particular importance in connection with the displaceable agitator feature above described, is the construction and arrangement of the discharge conduit 14 whereby the entire interior surface of the discharge conduit 14 is made readily accessible for cleaning. For the purpose of thoroughly cleaning the entire interior of the discharge conduit 14 the agitator 50 is displaced from the agitator chamber, by the simple maneuver of opening the hood 42, and then the displaceable end wall 22 of valve casing 18 is removed, taking with it the valve 24. This provides free access to the aerating chamber 17 through the now-open top of the reservoir 12 and provides easy access to the interior of the valve casing 18, through the now-open end thereof, and access to that portion of the conduit 14 between the valve casing and aerating chamber 17 through the apertured rear wall of the valve chamber, and further provides access to the final conduit section 23 through the valve chamber and normally open discharge end 15. With this structure the time required to thoroughly clean all fluid contact beverage portions of the machine has been reduced to a minimum. It will be noted that the reservoir supporting shelf structure 9 is provided at its front portion with a radially outwardly opening notch or recess 65 for receiving the aerating chamber defining portion of the discharge conduit 14.

The machine illustrated has been thoroughly tested and found to possess all the advantageous characteristics attributed thereto; and while I have shown and described the preferred embodiment of my novel device it will be understood that the same is capable of modification without departure from the spirit and scope of the invention as defined in the claims.

What I claim is:

1. In a bulk beverage storing and dispensing and aerating machine, a beverage reservoir having an open top, a gravity flow discharge conduit leading generally downwardly from the bottom of the reservoir having an open discharge end spaced from the reservoir, and defining a vertical axis aerating chamber immediately underlying the bottom of the reservoir and opening vertically into the reservoir and being of greatly reduced diameter with respect to the diameter of the reservoir, means for supplying air to said aerating chamber, said conduit defining a passageway between said reservoir and said aerating chamber, said passageway having an area of maximum restriction to flow through said conduit during flow therethrough, a cover for the open top of the reservoir, a motor and a motor driven agitator shaft carried by and depending from the cover, said agitator shaft being disposed in generally coaxial alignment with said aerating chamber and having a free lower end provided with a diametrically enlarged agitator head disposed in and generally coaxially of the aerating chamber and having a maximum diameter somewhat less than the diameter of the aerating chamber so that beverage will flow past the agitator and so that the agitator may be removed from and repositioned in the aerating chamber by movements in a line generally coaxial therewith and the aerating chamber, and means mounting the cover for pivotal opening and closing movements with respect to the reservoir and said aerating chamber, said means comprising a hinge joint having a generally horizontal axis so widely spaced from the agitator axis and disposed so closely adjacent the plane of the bottom of the agitator that under initial opening movements of the cover and final closing movements of the cover the agitator will respectively move out of and into the aerating chamber on an arcuate path that is generally tangential to and so nearly coaxial with the axis of the aerating chamber that the agitator will not contact the inside of the conduit during such movements.

2. The structure defined in claim 1 in further combination with an open-bottomed hood structure disposed over and enclosing the reservoir and defining the said reservoir cover, and wherein said hinge joint is to a lower bottom edge portion of the hood.

3. In a bulk beverage aerating and dispensing machine, an open-topped beverage reservoir, a gravity flow discharge conduit carried by and leading generally downwardly from the bottom of the reservoir and having an open discharge end spaced from the reservoir, said conduit comprising a diametrically enlarged portion immediately adjacent to and underlying the reservoir and opening thereinto, said enlarged conduit portion defining an aerating chamber of greatly reduced diameter with respect to the diameter of the reservoir, said conduit defining a passageway between said reservoir and said aerating chamber, said passageway having an area of maximum restriction to flow through said conduit during flow therethrough, a control valve located in said conduit between said aerating chamber and the discharge end thereof, a motor driven agitator shaft journalled adjacent the top of the reservoir and extending downwardly therethrough and having a free lower end extending into the aerating chamber and provided therein with an enlarged agitator portion, and means mounting the journalled agitator shaft and the discharge conduit equipped reservoir with freedom for relative movements with respect to one another such as will displace the agitator shaft from the aerating chamber and the reservoir in a direction generally longitudinally of the reservoir and aerating chamber.

4. In a bulk beverage storing and aerating and dispensing machine, a beverage storing reservoir, a gravity flow discharge conduit leading generally downwardly from the bottom of the reservoir and having an open discharge end spaced from the reservoir, said conduit comprising a diametrically enlarged portion immediately adjacent to and underlying the reservoir, said enlarged conduit portion defining an aerating chamber of greatly reduced diameter with respect to the reservoir, said conduit defining a passageway between said reservoir and said aerating chamber, said passageway having an area of maximum restriction to flow through said conduit during flow therethrough, a control valve located between the aerating chamber and the discharge end of said conduit, an agitator motor located adjacent to but above the top of the reservoir and having a depending agitator shaft extending downwardly through the reservoir and provided with an agitator at its lower end disposed in the aerating chamber portion of the gravity flow discharge conduit beyond the reservoir, the agitator being radially enlarged with respect to said shaft and serving to violently agitate and aerate the beverage flowing through the aerating chamber during dispensing periods when the valve is open and that portion of the agitator shaft within the reservoir being of relatively small radius as compared to the agitator and serving to impart mild agitation to the reservoir contained beverage.

5. The structure defined in claim 4 wherein the major portion of that part of the agitator shaft within the reservoir is of generally round cross section and of such relatively small diameter as to produce a minimum of agitation of the reservoir contained beverage but is provided adjacent to but above the bottom of the reservoir with a radially enlarged disc-like agitator flange to produce an increased but mild agitation of the reservoir contained beverage immediately adjacent the bottom of the reservoir.

6. In a bulk beverage storing and aerating and dispensing machine, a beverage storing reservoir, a gravity flow discharge conduit opening through and leading generally downwardly from the bottom of the reservoir and having an open discharge end spaced from the reservoir, a downwardly extending portion of said conduit underlying the reservoir defining a downwardly flaring aerating chamber in communication with the interior of the reservoir through a conduit throat portion, a control valve located between the aerating chamber portion of and the discharge end of said conduit, an agitator motor located adjacent to but above the top of the reservoir and having a depending agitator shaft extending downwardly through the reservoir in coaxial alignment with the aerating chamber and said throat portion and provided at its lower end with an agitator portion located in said aerating chamber, said agitator portion comprising a diametrically enlarged head located in the relatively small diameter upper end portion of the aerating chamber and carrying a plurality of circumferentially spaced depending agitating blades extending to the vicinity of the relatively large diameter bottom portion of the aerating chamber, the lower ends of said blades being free and unconnected, said blades being disposed generally radially of the shaft axis, the radially inner and outer edges of said blades extending generally parallel to the shaft axis and the said inner edges thereof being spaced from one another and the shaft axis, the diameter of said agitator head being less than the minimum diameter of the aerating chamber to allow upward removal of the agitator from the aerating chamber and throat portion and to allow flow of beverage there passed and through the aerating chamber when the valve is open, a portion of the agitator shaft disposed within said conduit serving to provide an area of maximum restriction in the conduit when the valve is open so as to prevent the building up of a head of beverage in the aerating chamber when the valve is open.

7. The structure defined in claim 6 in which the head of the agitator shaft is in the form of a generally circular disc spaced from the adjacent wall portions of the conduit but of sufficient diameter to provide an area of maximum restriction in the conduit when the valve is open.

8. The structure defined in claim 6 in which the downwardly flaring inner surface of the conduit defining the downwardly expanding aerating chamber wall opposite the agitator blades is provided with a plurality of longitudinally extending radially inwardly projecting ribs.

9. In a bulk beverage storing and aerating and dispensing machine, a beverage storing reservoir, a gravity flow discharge conduit leading generally downwardly from the bottom portion of said reservoir and having an open discharge end spaced from the latter, an intermediate downwardly extending portion of said conduit defining a downwardly flaring aerating chamber, a control valve located in said conduit between one end thereof and said aerating chamber, an agitator rotor concentrically disposed in said aerating chamber and journalled for rotation with respect to said conduit, motor means for driving the agitator rotor, said agitator rotor comprising a disc-like head concentrically disposed in the relatively small diameter upper end portion of the aerating chamber and carrying a plurality of circumferentially spaced depending agitator blades extending to the vicinity of the relatively large diameter bottom portion of the aerating chamber, said blades being free and unconnected except at said head, said blades being disposed generally radially of the agitator rotor, the radially inner and outer edges of said blades extending generally parallel to the axis of the agitator and the inner edges thereof being spaced from one another and the shaft axis, the minimum open area of the passage through said conduit when the valve is open being above the agitator blades.

10. The structure defined in claim 9 in which the inner surface of that portion of the conduit defining the downwardly expanding aerating chamber wall opposite the agitator blades is provided with a plurality of longitudinally extending radially inwardly projecting ribs each extending substantially the full length of the agitator blades and flaring wall portion.

References Cited in the file of this patent

UNITED STATES PATENTS

| | | |
|---|---|---|
| 2,060,277 | Butts | Nov. 10, 1936 |
| 2,315,018 | Lawrence | Mar. 30, 1943 |
| 2,360,603 | Ward | Oct. 17, 1944 |
| 2,494,719 | Rabjohn | Jan. 17, 1950 |
| 2,637,537 | Ernst | May 5, 1953 |
| 2,638,329 | Weygand et al. | May 12, 1953 |
| 2,688,470 | Marco | Sept. 7, 1954 |
| 2,703,966 | Snelson | Mar. 15, 1955 |
| 2,775,877 | Bruntjen | Jan. 1, 1957 |
| 2,777,675 | Stelzer et al. | Jan. 15, 1957 |